(12) United States Patent
Fukamachi

(10) Patent No.: US 12,422,272 B2
(45) Date of Patent: Sep. 23, 2025

(54) INFORMATION PROCESSING APPARATUS, MOVABLE APPARATUS, INFORMATION PROCESSING METHOD, AND STORAGE MEDIUM

(71) Applicant: CANON KABUSHIKI KAISHA, Tokyo (JP)

(72) Inventor: Hitoshi Fukamachi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 300 days.

(21) Appl. No.: 18/193,795

(22) Filed: Mar. 31, 2023

(65) Prior Publication Data

US 2023/0324199 A1   Oct. 12, 2023

(30) Foreign Application Priority Data

Apr. 11, 2022   (JP) .................................. 2022-065404

(51) Int. Cl.
*G01C 21/00* (2006.01)
*G06V 20/50* (2022.01)

(52) U.S. Cl.
CPC ...... *G01C 21/3811* (2020.08); *G01C 21/3837* (2020.08); *G06V 20/50* (2022.01)

(58) Field of Classification Search
CPC . G01C 21/3811; G01C 21/3837; G06V 20/50

USPC ........................................................ 701/450
See application file for complete search history.

(56) References Cited

U.S. PATENT DOCUMENTS

| | | | | |
|---|---|---|---|---|
| 2005/0206726 | A1* | 9/2005 | Yoshida | H04N 7/181 348/143 |
| 2018/0322777 | A1* | 11/2018 | Titze | G08G 1/0141 |
| 2021/0229702 | A1* | 7/2021 | Tsuji | B60W 60/0016 |
| 2021/0341308 | A1* | 11/2021 | Ivanov | G01C 21/3837 |
| 2022/0139086 | A1* | 5/2022 | Park | G06V 10/82 382/103 |
| 2023/0023651 | A1 | 1/2023 | Fukamachi | |
| 2023/0144543 | A1* | 5/2023 | Dake | G01C 21/3881 701/450 |
| 2023/0316774 | A1* | 10/2023 | Tofukuji | G06T 17/00 382/104 |

FOREIGN PATENT DOCUMENTS

| EP | 3454548 A1 * | 3/2019 | .......... G06T 3/4038 |
|---|---|---|---|
| JP | 2019-12504 A | 1/2019 | |

* cited by examiner

*Primary Examiner* — Tuan C To
(74) *Attorney, Agent, or Firm* — VENABLE LLP

(57) ABSTRACT

An information processing apparatus that controls the movement of a movable apparatus acquires information regarding surroundings of the movable apparatus, analyzes the type of an object that is present around the movable apparatus by using the acquired sensor information, and generates or updates an environment map that is surrounding information of the movable apparatus on the basis of the analyzed type of the object.

9 Claims, 10 Drawing Sheets

FIG. 9

| No | Object type | Object position | | Evaluation value |
|---|---|---|---|---|
| | | X | Y | |
| 1 | Person | 141 | 390 | 15 |
| 2 | Person | 355 | 446 | 15 |
| 3 | AGV | 295 | 264 | 10 |
| 4 | Wall | 100 | 190 | 95 |
| 5 | Cart | 537 | 159 | 10 |
| 6 | Workbench | 515 | 430 | 90 |
| 7 | ... | ... | ... | ... |
| 8 | ... | ... | ... | ... |
| 9 | ... | ... | ... | ... |
| 10 | ... | ... | ... | ... |
| + | ... | ... | ... | ... |

INFORMATION PROCESSING APPARATUS, MOVABLE APPARATUS, INFORMATION PROCESSING METHOD, AND STORAGE MEDIUM

BACKGROUND OF THE INVENTION

Field of the Invention

The present invention relates to an information processing apparatus, a movable apparatus, an information processing method, a storage medium, and the like.

Description of the Related Art

In factories, distribution warehouses, or the like, automatic guided vehicles (AGVs) and autonomous mobile robots (AMRs) are used to transport goods such as products and parts to predetermined locations. Autonomous mobile cleaning robots are used to automatically clean indoor spaces.

Japanese Patent Laid-Open No. 2019-12504 discloses a configuration for detecting an obstacle and then adding detected obstacle information to an environment map for position and posture measurement in movement control of a movable apparatus.

However, in the configuration in Japanese Patent Laid-Open No. 2019-12504, a feature of an obstacle that exists only temporarily is also added to the environment map, resulting in a problem of reduced position and posture measurement accuracy.

SUMMARY OF THE INVENTION

The present invention has been made in view of the above problems, and one of the objects thereof is to provide an information processing apparatus capable of generating or updating an environment map according to an object.

According to one aspect of the present invention, there is provided an information processing apparatus comprising at least one processor or circuit configured to function as: a sensor information acquisition unit configured to acquire information regarding surroundings of a movable apparatus; an object analysis unit configured to analyze the type of an object that is present around the movable apparatus by using the sensor information acquired by the sensor information acquisition unit; and an environment map generation unit configured to generate or update an environment map that corresponds to surrounding information of the movable apparatus on the basis of the type of the object analyzed by the object analysis unit.

Further features of the present invention will become apparent from the following description of embodiments with reference to the attached drawings.

BRIEF DESCRIPTION OF THE DRAWINGS

FIGS. 8A and 8B are schematic diagrams showing an example of a user interface (UI) screen output to a display unit 206 in Third Embodiment, in which FIG. 8A is a diagram in which map elements of a generated environment map are projected onto a plane corresponding to a floor surface, and FIG. 8B is a diagram showing an example in which the staying value 809 of each object is superimposed and displayed on a display screen 801 as a data bar.

FIG. 9 is a table showing an example of the type of object, coordinate position information of the object, and an evaluation value (staying value) of the object calculated by the staying analysis unit 312.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate description will be omitted or simplified. In the embodiments, an example of an information processing system in which an information processing apparatus is used for controlling a movable apparatus such as an AGV or an AMR will be described. However, movable apparatuses in the information processing system include onboard cameras, drones, robots, and the like.

First Embodiment

In First Embodiment, an example in which a configuration of First Embodiment is applied if there are a plurality of objects on a movement path of a movable apparatus will be described. In First Embodiment, the movable apparatus is, for example, a cleaning robot, and when there are objects such as garbage to be picked up, people, walls, trolleys, and workbenches on a movement path of the movable apparatus or in a surrounding environment of the movable apparatus, an environment map for position and posture measurement indicating a position or characteristics of an object is generated or updated.

Specifically, in First Embodiment, an object that is present around the movable apparatus is recognized, and an evaluation value regarding a possibility that the object may stay at a recognized position is calculated. In First Embodiment, an evaluation value regarding the possibility that the object may stay at the recognized position is defined as a staying value.

A series of object analysis for calculating this staying value will be hereinafter referred to as staying analysis. If a calculated staying value of the object is great, a feature of the object is added to an environment map. If the staying value is small, the feature of the object is not added to the environment map. Alternatively, the environment map is not updated. As described above, in First Embodiment, it is controlled whether the environment map is generated or updated on the basis of the staying value of the object. By using the environment map generated as described above to measure a position and a posture of the movable apparatus, the position and posture measurement accuracy of the movable apparatus can be improved.

Figure 1:
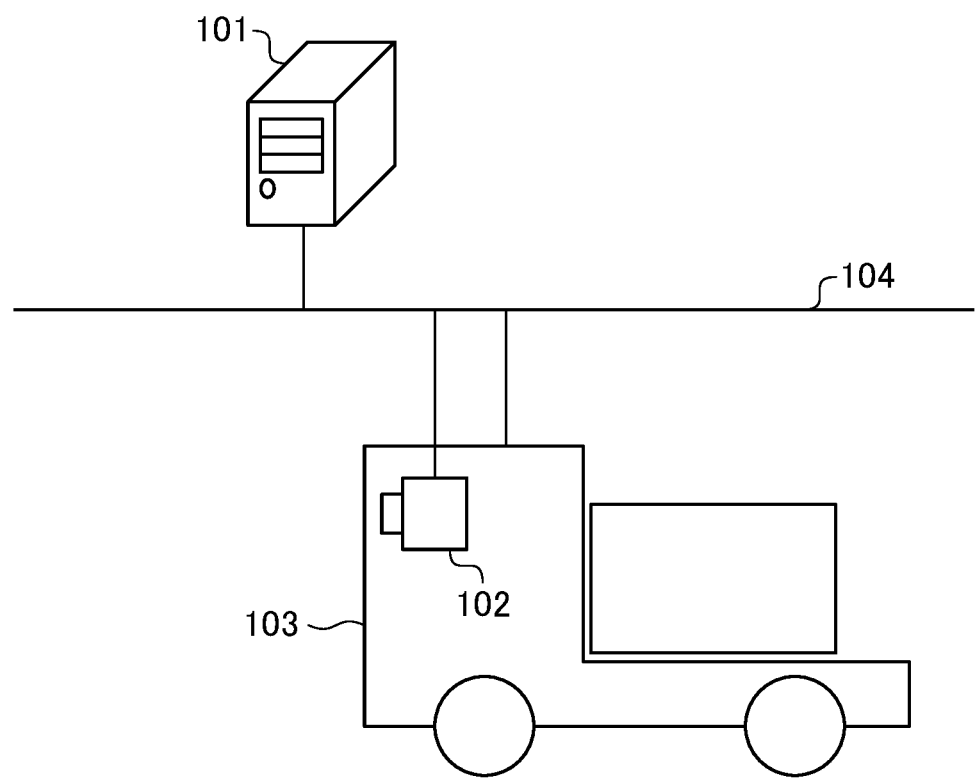
FIG. 1 is a schematic diagram showing the overall configuration of an information processing system according to First Embodiment of the present invention.

FIG. 1 is a schematic diagram showing the overall configuration of an information processing system according to First Embodiment of the present invention. As shown in the same figure, the information processing system includes an information processing apparatus 101, a sensor 102, a movable apparatus 103, a network 104, and the like. The information processing apparatus 101 is connected to the sensor 102 and the movable apparatus 103 via a network 104.

In the same figure, the network. 104 is a wired connection network such as Ethernet (registered trademark) or a wireless connection network such as a wireless LAN. The network 104 is not limited to this as long as a configuration in which information communication is performed between connected devices is provided. The sensor 102 is, for example, a stereo camera, and acquires sensor data (captured image data).

The acquired sensor data is transmitted to the information processing apparatus 101. The movable apparatus 103 calculates a position and a posture thereof and controls the movable apparatus on the basis of the sensor data received from the information processing apparatus 101. Movable apparatus control in First Embodiment is on/off control of movement of the movable apparatus, control of a movement speed, a direction, or the like, or for example, on/off of a cleaning operation of a floor surface.

The information processing apparatus 101 executes, on the sensor data (captured image data) received from the sensor 102, recognizing an object in the captured image and executes a staying analysis process of calculating an evaluation value (staying value) regarding a possibility that the object may stay at a recognized position. Information regarding the position and the posture of the movable apparatus 103 is acquired on the basis of an image recognition result. The information regarding the position and the posture is information indicating a position and a posture of the movable apparatus in the real space.

The information processing apparatus 101 generates or updates an environment map on the basis of the acquired position information and staying value of the movable apparatus 103. The environment map is a map having information indicating positions or characteristics of objects around the movable apparatus 103. The environment map is used to measure a position and a posture of the movable apparatus 103. Details of software functions of the information processing apparatus 101 will be described later.

Figure 2:
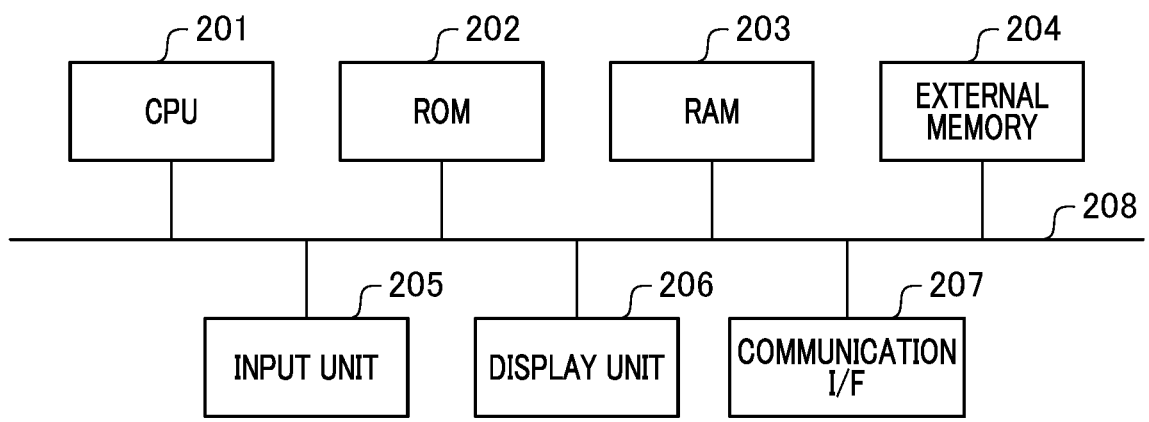
FIG. 2 is a block diagram showing a hardware configuration of an information processing apparatus 101 of First Embodiment.

FIG. 2 is a block diagram showing a hardware configuration of the information processing apparatus 101 of First Embodiment. A central processing unit (CPU) 201 is a computer that controls various devices connected to a system bus 208. A ROM 202 stores a BIOS program and a boot program. A RAM 203 is used as a main storage device for the CPU 201. An external memory 204 stores computer programs and the like processed by the information processing apparatus 101.

An input unit 205 is a keyboard, a mouse, a robot controller, or the like, and processes inputs such as information from a user. A display unit 206 has a display device such as a liquid crystal display or a projector, and outputs a calculation result from the information processing apparatus 101 to the display device in response to an instruction from the CPU 201 and displays the calculation result on a screen. A communication interface unit 207 performs information communication with the sensor 102 or the movable apparatus 103. The input unit 205, the display unit 206, or the like is not required to be inside the information processing apparatus, and may be disposed outside the information processing apparatus.

Figure 3:
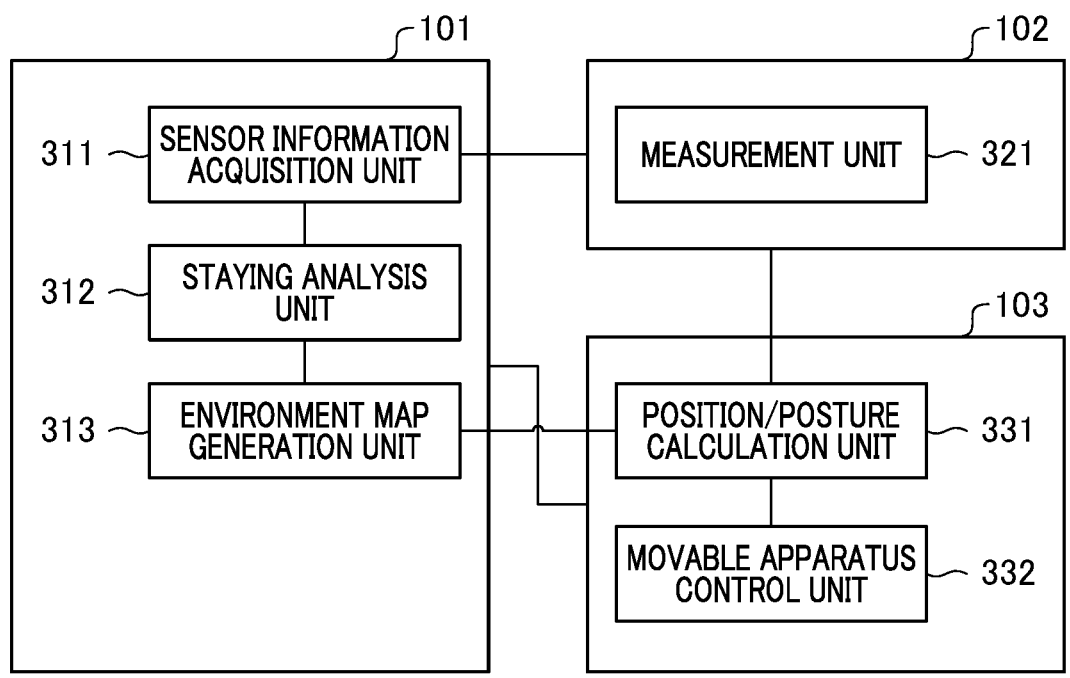
FIG. 3 is a functional block diagram showing the information processing apparatus 101, a sensor 102, and a movable apparatus 103 of First Embodiment.

FIG. 3 is a functional block diagram showing the information processing apparatus 101, the sensor 102, and the movable apparatus 103 of First Embodiment, and a functional configuration of the information processing system of First Embodiment will be described with reference to FIG. 3.

Some of the functional blocks shown in FIG. 3 are realized by the CPU as a computer included in each of the information processing apparatus 101, the sensor 102, and the movable apparatus 103 executing a computer program stored in a memory serving as a storage medium. However, some or all of the functional blocks may be realized by hardware. As hardware, a dedicated circuit (ASIC), a processor (a reconfigurable processor or a DSP), or the like may be used. The functional blocks shown in FIG. 3 need not be built in the same casing, and may be configured by separate devices connected to each other via signal paths.

The information processing apparatus 101 includes a sensor information acquisition unit 311, a staying analysis unit 312, an environment map generation unit 313, and the like. The sensor information acquisition unit 311 receives and acquires sensor data measured by a measurement unit 321 of the sensor 102. That is, information regarding the surroundings of the movable apparatus is acquired.

The staying analysis unit 312 performs a staying analysis process on the sensor data acquired by the sensor information acquisition unit 311. Staying analysis is to recognize an object from sensor data and identify the type of the object. That is, sensor information acquired by the sensor information acquisition unit is used to perform object recognition, and thus the type of object present around the movable apparatus is analyzed. A staying value indicating a possibility that the object may remain (stay) at that position is acquired on the basis of the type of object.

The environment map generation unit 313 performs a process of generating an environment map for position and posture measurement on the basis of the object position information and the staying value calculated by the staying analysis unit 312. That is, an environment map that corresponds to information regarding the surroundings of the movable apparatus is generated or updated on the basis of the type of the analyzed object. Details of the processes performed by the staying analysis unit 312 and the environment map generation unit 313 will be described later. The sensor 102 is, for example, a stereo camera using a CCD image sensor, CMOS image sensor, or the like. A single CMOS image sensor having a dual pixel auto focus (DAF) function may be used.

The movable apparatus 103 includes a position/posture calculation unit 331 and a movable apparatus control unit 332. The position/posture calculation unit 331 calculates a position and a posture of the movable apparatus 103 on the basis of the captured image data acquired by the measurement unit 321 and the environment map stored in the environment map generation unit 313. The movable apparatus control unit 332 performs on/off control of an engine or a motor that is a drive source of the movable apparatus 103, speed control, direction control to change orientations of wheels, and on/off control of a suction motor or the like for cleaning. That is, driving or the like of the movable apparatus is controlled on the basis of the environment map.

As a method of calculating a position and a posture using sensor data (captured image data), a simultaneous localization and mapping (SLAM) technology or the like may be used. The SLAM technology may employ a technology disclosed in R. Mur-Artal et al., "ORB-SLAM2: An Open-Source SLAM System for Monocular, Stereo, and RGB-D Cameras", 2017.

Figure 4:
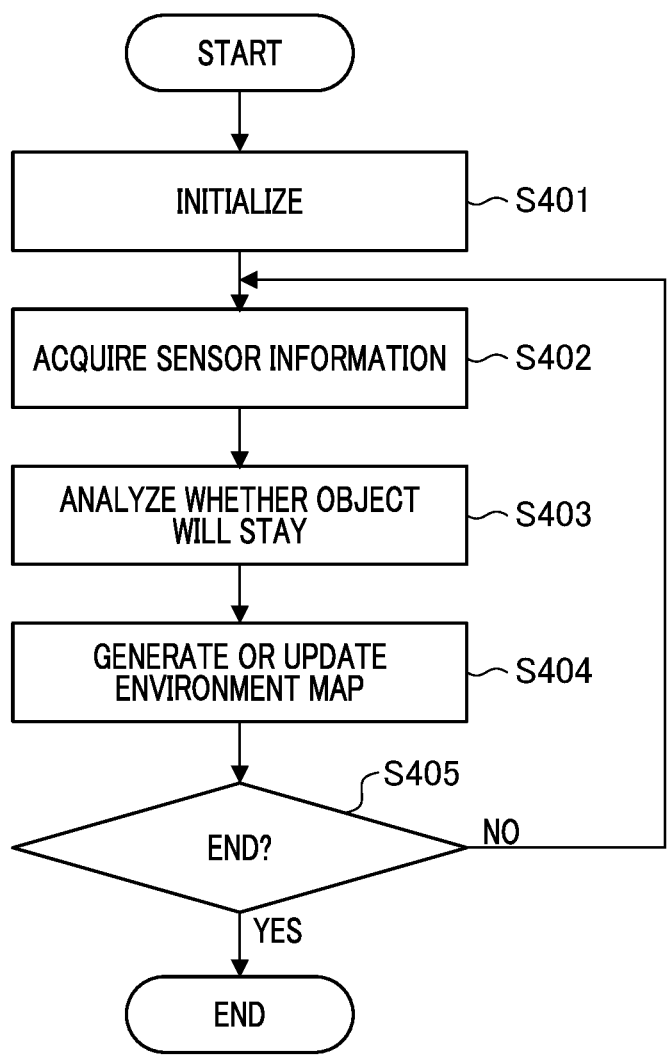
FIG. 4 is a flowchart showing a processing procedure of the information processing apparatus 101 in First Embodiment.

FIG. 4 is a flowchart showing a processing procedure of the information processing apparatus 101 in First Embodiment. Each process shown in the flowchart of FIG. 4 is executed by the CPU 201 executing a control program stored in the memory. A method of generating an environment map assuming that a plurality of objects are present on a movement path of the movable apparatus 103 or in a surrounding environment of the movable apparatus 103 will be described according to the flowchart.

In step S401, the CPU 201 initializes the system. A computer program is read from the external memory 204 to make the information processing apparatus 101 operable. In step S402 (sensor information acquisition step), the CPU 201 causes the sensor information acquisition unit 311 to acquire captured image data (sensor data) captured by the sensor 102. That is, information regarding the surroundings of the movable apparatus is acquired. Here, the captured image is captured image data obtained by capturing an image of the surroundings of the movable apparatus 103 at any time.

In step S403, the CPU 201 causes the staying analysis unit 312 to execute a staying analysis process on an object. That is, an analysis process is performed to detect an object that is present around the movable apparatus and to identify the type of the object on the basis of the sensor information (captured image data) acquired in step S402. An evaluation value (staying value) regarding a possibility that the object may stay at a recognized position is calculated. Details of the process will be described later with reference to FIG. 5.

In step S404 (environment map generation step), the CPU 201 causes the environment map generation unit 313 to perform a process of generating or updating an environment map that corresponds to surrounding information of the movable apparatus on the basis of the object type, position information of the object, and the staying value calculated in step S403. Details of the process will be described later with reference to FIG. 6.

In step S405, the CPU 201 executes an end determination process. That is, it is determined whether or not to continue the environment map generation process. Specifically, if the travel along a planned travel route is completed, or if an end instruction is received from the user, the environment map generation processing is ended. If the environment map generation process is not ended, the process proceeds to step S402 and is continued.

Figure 5:
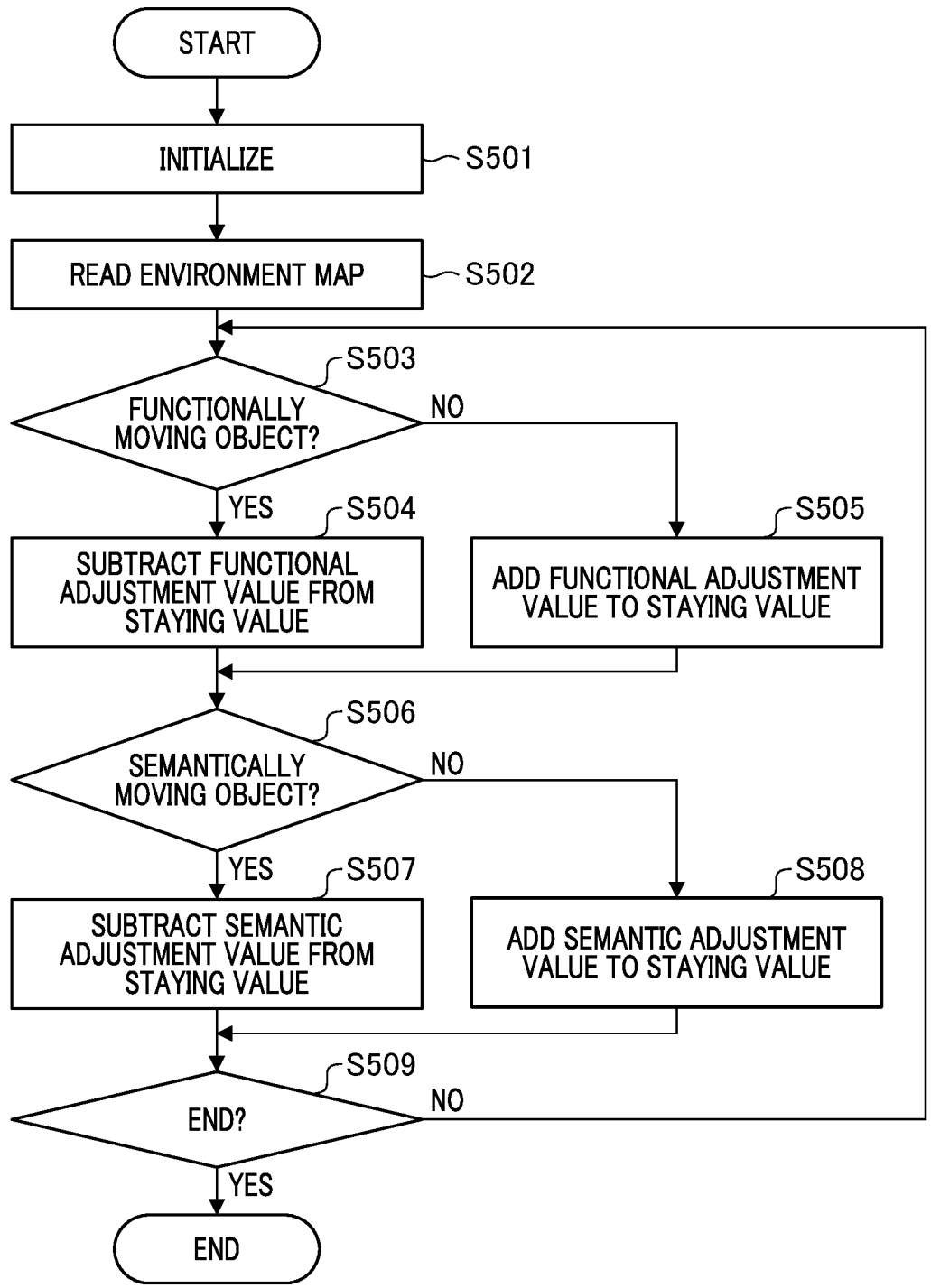
FIG. 5 is a flowchart for describing details of a process performed by a staying analysis unit 312 in step S403.

FIG. 5 is a flowchart for describing details of the process performed by the staying analysis unit 312 in step S403. With reference to FIG. 5, object analysis and an evaluation value calculation process in step S403 in FIG. 4 will be described. Each process shown in the flowchart of FIG. 5 is executed by the staying analysis unit 312 by the CPU 201 executing the control program stored in the memory.

In step S501, the staying analysis unit 312 initializes the object analysis process. A process of reading an object model used in the object recognition process is performed on the basis of the captured image data acquired by the sensor information acquisition unit 311. The object model read here is a template image for each object type. It is assumed that template images of a plurality of object models are stored in the external memory 204 in advance.

The plurality of object models also include wheel models (for example, object models such as vehicles with wheels). In the case of an object model with wheels, it is possible to determine that an object is a functionally moving object. Thus, in step S502, a wheel model used for determining whether the object is a functionally moving object is also read. A setting value table in which initial values or adjustment values for each object type for calculating a staying value of an object are set in advance is read.

In step S502, the staying analysis unit 312 recognizes an object by using each object model for the captured image read in step S501. Here, for example, object recognition is performed by applying a template matching method. Specifically, a face model for detecting a person and a vehicle model for detecting a car are sequentially applied to obtain the type of object. For all the objects recognized in step S502, the processes in and after step S503 are continuously executed for each object.

In the processes from step S503 to step S508, the staying analysis unit 312 calculates an evaluation value (staying value) regarding a possibility that the object may stay at the position recognized in step S502. Here, if the staying value is small, this indicates that the object is determined as being in motion and is unlikely to stay at the position. On the other hand, if the evaluation value is great, this indicates that it is determined that the object does not move much and is more likely to stay at the position.

In step S503, the staying analysis unit 312 determines whether the object is a functionally moving object and calculates a staying value. When calculating a staying value, first, the setting value table read in step S501 is referred to, and an initial value of the staying value is set according to the type of object obtained in step S502. For example, if the object is recognized as a box, the set value table read in step S501 is referred to, and the staying value is set to 90, for example.

It is further determined whether or not the object recognized in step S502 has wheels by using a template matching method or the like with the wheel model read in step S501. If it is determined that the object has wheels, the process proceeds to step S504. If it is determined that the object does not have wheels, the process proceeds to step S505.

In step S504, the staying analysis unit 312 updates the staying value by subtracting the functional adjustment value (for example, 20) read in step S501 from the initial value of the staying value set in step S503. That is, if the object is recognized as the box as described above, the staying value is set to 90, but the staying value is decreased by subtracting the functional adjustment value. In step S505, the staying analysis unit 312 updates the staying value by inversely adding the functional adjustment value (for example, 20) to the initial value of the staying value set in step S503.

In step S506, the staying analysis unit 312 determines whether the object is a semantically moving object (for example, a person, an animal, or garbage to be cleaned). Specifically, it is determined whether the type of object obtained in step S502 is within a preset category of semantically moving object types. If the type of object is within the category, that is, a semantically moving object type, the process proceeds to step S507. If No in step S506, the process proceeds to step S508.

As described above, the types of preset semantically moving objects include people, animals, and garbage to be cleaned. In order to determine whether an object is garbage to be cleaned, the type of object (type of garbage) and a size that can be sucked are defined in advance. If the object is garbage with a predetermined size or less to be cleaned, the object is determined as being a semantically moving object because the object is sucked by the cleaning robot as the movable apparatus of First Embodiment, and thus a determination result in step S506 is Yes. On the other hand, a wall, a floor, or a large-sized object that cannot be sucked is determined as not being a semantically moving object, and thus a determination result in step S506 is No.

In step S507, the staying analysis unit 312 subtracts a semantic adjustment value (for example, 30) from the staying value updated in step S504 or S505. In step S508, the staying analysis unit 312 adds a semantic adjustment value (for example, 30) to the staying value updated in step S504 or S505.

In step S509, the staying analysis unit 312 executes an end determination process. If the processes from step S503 to step S508 are completed on all processing target objects recognized in step S502, the series of processes is ended. If the processes have not been completed on all the objects recognized in step S502, the process proceeds to step S503 to continue the processes on the next object.

Through the above processes, the staying analysis unit 312 executes a process of calculating the type of object and an evaluation value (staying value) regarding a possibility that the object may stay at an initial position, and the environment map generation unit 313 generates or updates an environment map on the basis of an analysis result from the staying analysis unit 312. In the example in FIG. 5, a staying value is varied depending on at least whether the object has wheels or whether the object is smaller than a predetermined size. In other words, in addition to determining a staying value on the basis of a recognition result of the object, it is also determined whether the object is a functionally or semantically moving object, and the staying value is corrected with a corresponding adjustment value to improve the reliability of the staying value.

Figure 6:
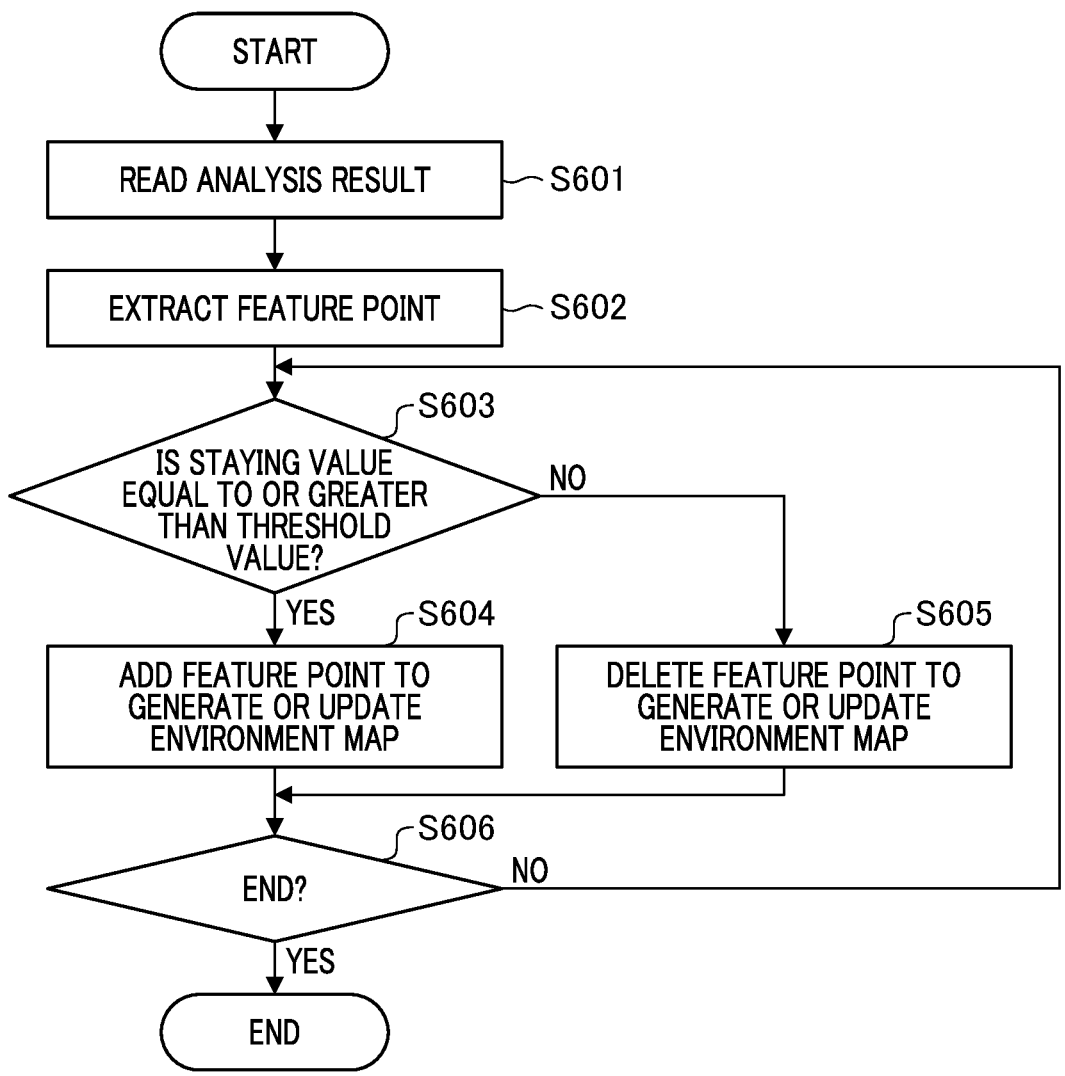
FIG. 6 is a flowchart for describing a process performed by an environment map generation unit 313 in step S404 in FIG. 4.

FIG. 6 is a flowchart for describing the process performed by the environment map generation unit 313 in step S404 in FIG. 4, and details of step S404 will be described with reference to FIG. 6. Each process shown in the flowchart of FIG. 6 is realized by the environment map generation unit 313 by the CPU 201 executing the control program stored in the memory.

In step S601, the environment map generation unit 313 reads analysis results calculated by the staying analysis unit 312. The analysis results read here are image data of each object and a staying value that is an evaluation value regarding whether the object stays at an initial position. The environment map generation unit 313 sequentially repeats the processes from step S602 to step S606 on the basis of the staying value of the object read in step S601 to generate or update the environment map.

In step S602, the environment map generation unit 313 extracts information regarding feature points of each object from the image data of each object read in step S601. An extraction method such as scale invariant feature transform (SIFT) or speeded up robust features (SURF) is used to extract feature point information.

In step S603, the environment map generation unit 313 determines whether or not information regarding the feature points (a staying value or the like) of each object read in step S601 is equal to or greater than a threshold value set in advance. Here, if the staying value is equal to or greater than the threshold value, that is, if there is a high possibility that the object may stay at an initial position, the process proceeds to step S604. On the other hand, if the staying value is smaller than the threshold value, that is, if there is a low possibility that the object may stay at an initial position, the process proceeds to step S605.

In step S604, the environment map generation unit 313 adds the information regarding the feature points of the object extracted in step S602 to the environment map to generate or update the environment map. In step S605, the environment map generation unit 313 deletes the information regarding the feature points of the object extracted in step S602 to generate or update the environment map. Alternatively, the environment map is not updated.

In step S606, the environment map generation unit 313 executes an end determination process of the environment map generation/update process. If the processes have been completed on all the objects that are processing targets read in step S601, the series of environment map generation processes is ended. If the processes have not been completed on all the objects read in step S601, the process returns to step S602 to continue the processes on the next object.

As described above, in First Embodiment, if an object of which a staying value is equal to or greater than a threshold value (equal to or greater than a predetermined value) is recognized, feature points of the object are added to update the environment map, and if an object of which a staying value is smaller than the threshold value is recognized (smaller than a predetermined value), the environment map is not updated. Therefore, the position and posture measurement accuracy of the movable apparatus 103 can be improved.

In First Embodiment, an example in which sensor data (captured image data) measured by the sensor 102 is used as input data for object recognition performed by the staying analysis unit 312 and position/posture calculation performed by the position/posture calculation unit 331 of the movable apparatus 103 has been described, but the present invention is not limited to this. Data used for object recognition performed by the staying analysis unit 312 and data used for position/posture calculation performed by the position/posture calculation unit 331 of the movable apparatus 103 may be data from different sensors.

For example, the image data for object recognition performed by the staying analysis unit 312 may be data captured by a camera with a fixed viewpoint installed to capture an image of a movement region of the movable apparatus from above. In this case, by using a coordinate conversion table representing a correspondence relationship between coordinate values of a captured image of the bird's-eye camera and coordinate values in the real space, the coordinate values of the captured image of the bird's-eye camera can be converted into a corresponding position in the real space. The sensor information may be imaging data obtained by imaging an object around a movable apparatus, distance imaging data which includes distance information to a surrounding object, or three-dimensional point group data representing a shape of a surrounding object, and may include any information.

On the other hand, as input data for the position/posture calculation performed by the position/posture calculation unit 331 of the movable apparatus 103, a distance image measured by a distance sensor or three-dimensional point group data measured by light detection and ranging (Li-DAR) may be used.

In First Embodiment, an example of a configuration in which the information processing apparatus 101, the sensor 102, the movable apparatus 103, and the like are connected via the network 104 has been described, but the present invention is not limited to this. The information processing apparatus 101 and the sensor 102 may be configured inside the movable apparatus 103. In this configuration, the information processing apparatus 101, the sensor 102, and the movable apparatus 103 are connected via the internal system bus 208, and perform data communication with each other. In First Embodiment, the template matching method is applied as an object recognition method, but the object recognition method is not necessary to be limited to this. Neural networks and deep learning may be applied.

In First Embodiment, an example in which an initial value for each object type is set in advance in order to calculate an evaluation value (staying value) regarding a possibility that an object may stay at an initial position has been described, but an initial value may be set by using information other than an object type. As information other than an object type, a size of an object or a size of a contact surface between an object and a floor (ground) may be measured, and an initial value may be set. An initial value may be changed by estimating a weight or hardness of an object. Specifically, if the object is large, if the contact surface between the object and the floor is large, if the object is heavy, or if the object is hard, an initial value of a staying value is set to a great value.

In First Embodiment, an example of garbage to be cleaned has been described as a semantically moving object, but other semantically moving objects may be defined. For example, if the movable apparatus 103 is a sealed package to be delivered, the package may be defined as a semantically moving object. In order to recognize a semantically moving object, an infrared image may be acquired from an infrared camera or the like, and it may be determined whether or not the object is a creature such as a human being or an animal by referring to a temperature of the object.

Second Embodiment

In First Embodiment, if a plurality of objects are present on a movement path of the movable apparatus 103 or in a surrounding environment of the movable apparatus 103, the staying analysis unit 312 calculates the type of object, position information of the object, and a staying value that is an evaluation value regarding whether the object may stay at the position. An example of generating or updating an environment map on the basis of an analysis result has been described.

In Second Embodiment, an example will be described in which an environment map of a movement path of the movable apparatus 103 has already been generated and the environment map is updated if a surrounding environment of the movable apparatus 103 has changed. Specifically, a region where an environment has changed is extracted, and a staying analysis process is performed only on that region. Compared with First Embodiment, the number of objects that are processing targets in the staying analysis process can be reduced, and a processing load associated with updating the environment map can be reduced. Descriptions related to portions similar to those of First Embodiment will be omitted, and will focus on differences.

Figure 7:
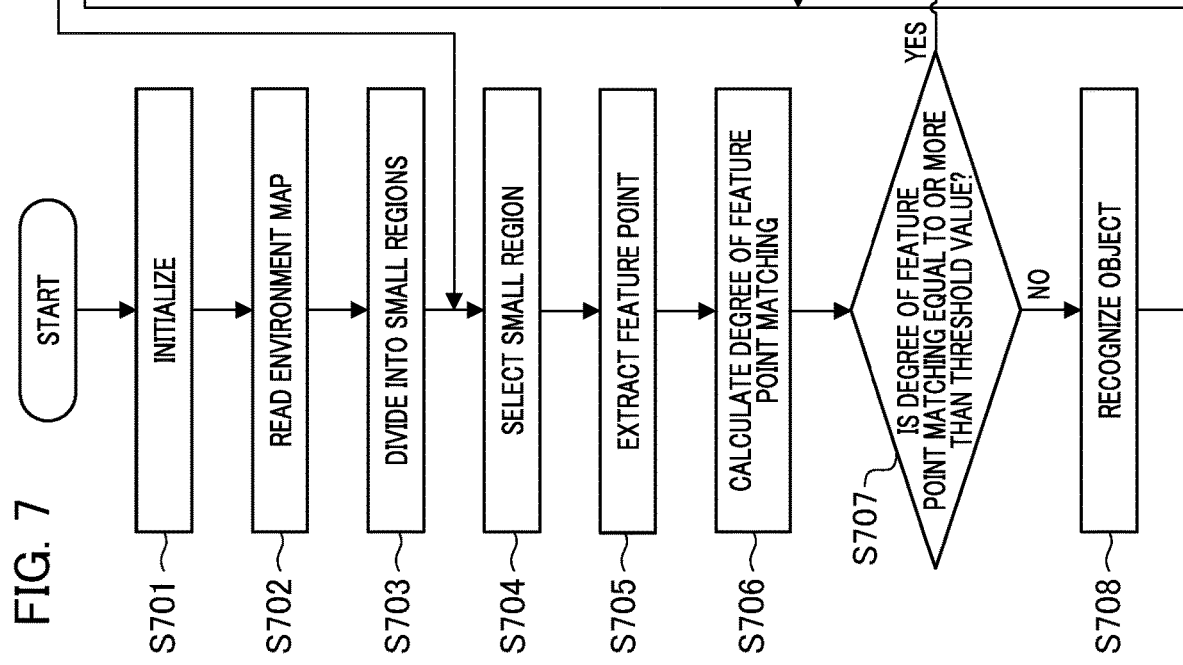
FIG. 7 is a flowchart illustrating details of a process performed by a staying analysis unit 312 in Second Embodiment.

FIG. 7 is a flowchart for describing details of a process performed by the staying analysis unit 312 in Second Embodiment. Since the processes from step S708 to step S715 are the same as the processes from step S502 to step S509 in FIG. 5, a description thereof will be omitted. Each process shown in the flowchart of FIG. 7 is executed by the staying analysis unit 312 by the CPU 201 executing the control program stored in the memory.

In step S701, the staying analysis unit 312 initializes a staying analysis process. Similarly to the process in step S501 in FIG. 5, captured image data acquired by the sensor information acquisition unit 311 is read. A process of reading a plurality of object models prepared in advance is performed. That is, a setting value table in which initial values or predetermined values for each object type for calculating a staying value of an object are set in advance is read. In Second Embodiment, a threshold value for the degree of feature point matching used in the process in step S706 is set.

In step S702, the staying analysis unit 312 performs a process of reading the environment map generated in advance. In step S703, the staying analysis unit 312 divides the captured image read in step S701 into a plurality of small regions. Any method may be used to divide the region, but in Second Embodiment, the captured image is divided into five each in the vertical direction and the horizontal direction, and divided into 25 rectangular small regions.

In step S704, the staying analysis unit 312 selects an unprocessed small region from among the small regions divided in step S703. In step S705, the staying analysis unit 312 extracts feature point information for the small region selected in step S704. Similarly to the process in step S602, the feature points are extracted from the captured image by using a method such as scale invariant feature transform (SIFT) or speeded up robust features (SURF).

In step S706 the staying analysis unit 312 calculates a difference between the feature point information in the environment map read in step S702 and the feature point information extracted from the current captured image in step S705, and calculates the degree of feature point matching.

The degree of feature point matching is an evaluation value indicating the degree of similarity of each feature point. If the degree of feature point matching is high, this indicates that there is a low possibility that the environment changes, such as the number of objects from the time of generation of the environment map read in step S701 having changed or an object moving. On the other hand, if the degree of feature point matching is low, this indicates that there is a high possibility that the environment changes, such as the number of objects changing or an object moving between the surrounding environment at the time of generation of the environment map and the surrounding environment obtained from the current captured image.

In step S707, the staying analysis unit 312 determines whether or not the degree of feature point matching calculated in step S706 is equal to or more than a preset threshold value. If the degree of feature point matching is equal to or more than the threshold value, it is determined that there is no change in the environment between the time of generation of the environment map and the present time, and the process proceeds to step S716 without executing the processes from steps S708 to S715.

On the other hand, if the degree of feature point matching is less than the threshold value, it is determined that the environment has changed between the time of generation of the environment map and the present time, and the process proceeds to step S708. Steps S708 to S715 respectively correspond to steps S503 to S509 in FIG. 5, and are the same processes, and thus description thereof will be omitted.

In step S716, the staying analysis unit 312 executes an end determination process for all the small regions. If the processes from step S704 to step S715 have been completed on all the small regions, the series of processes is ended. If the processes have not been completed on all the small regions, the process returns to step S704, the next unprocessed small region is selected, and the subsequent processes are continued.

As described above, in Second Embodiment, the type of object is analyzed for regions where a difference between feature points extracted from sensor information and feature points of an environment map is equal to or more than a predetermined value. Therefore, it is possible not only to improve the position and posture measurement accuracy of the movable apparatus 103, but also to limit a region where the staying analysis process is performed to a region where an environment has changed. Consequently, the number of objects that are processing targets in the staying analysis process can be reduced compared with First Embodiment, and the processing load associated with updating an environment map can be reduced.

Third Embodiment

In First Embodiment and Second Embodiment, an example has been described in which the staying analysis unit 312 calculates the type of object, position information of the object, and a staying value that is an evaluation value regarding whether the object may stay at that position, and generates or updates the environment map on the basis of an analysis result. In Third Embodiment, an example in which an analysis result calculated by the staying analysis unit 312 is displayed on a display unit to be visualized will be described. A functional configuration of the information processing apparatus 101 of Third Embodiment is a configuration in which a display unit 206 for displaying an environment map generated by the environment map generation unit is added to the functional configuration in FIG. 3 described in First Embodiment.

Figure 8A:
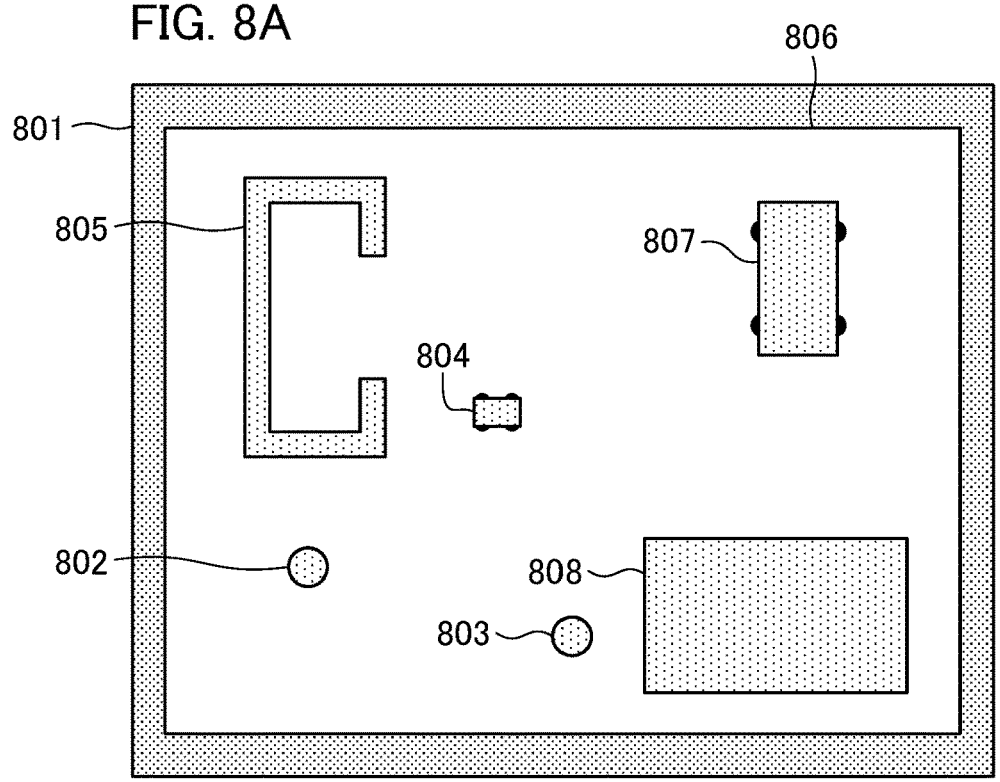
Figure 8B:
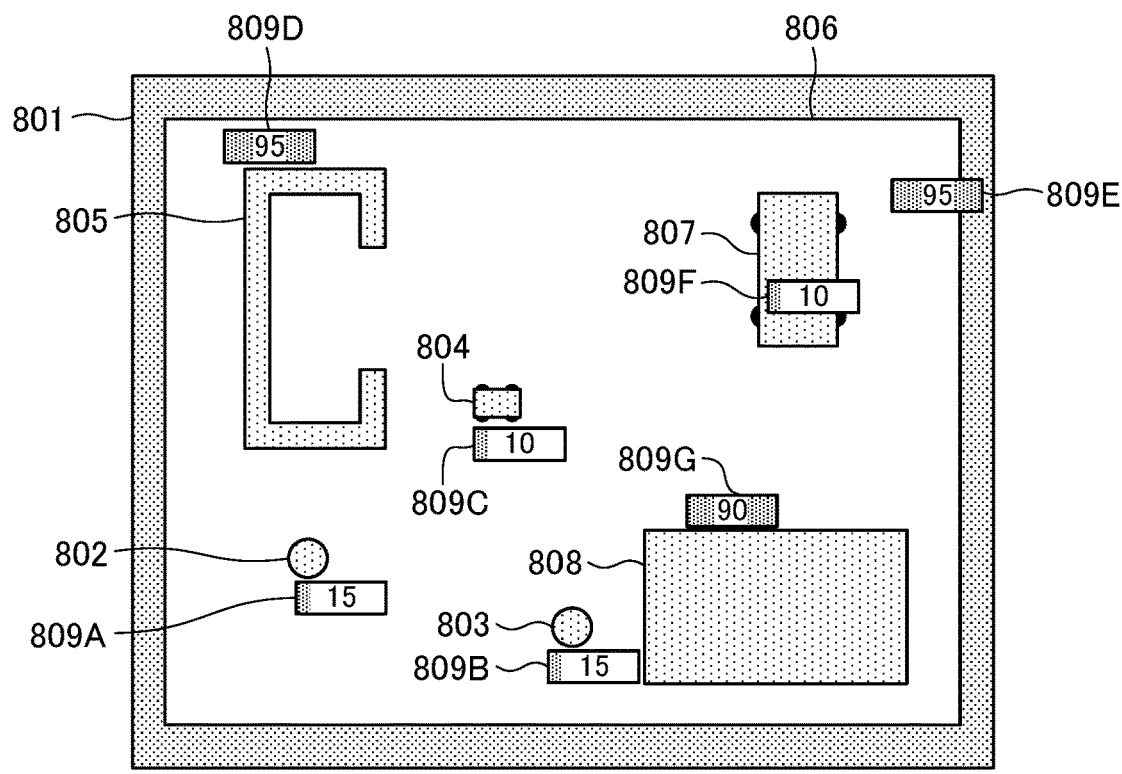

FIGS. 8A and 8B are schematic diagrams showing an example of a user interface (UI) screen output to the display unit 206 in Third Embodiment. FIG. 8A is a diagram in which map elements of a generated environment map are projected onto a plane corresponding to a floor surface. A bird's-eye captured image from a bird's-eye viewpoint acquired by the sensor information acquisition unit 311 may be shown.

Each object is displayed on the display screen 801. The reference numerals 802 and 803 denote persons, the reference numeral 804 denotes the movable apparatus 103, the reference numerals 805 and 806 denote walls, the reference numeral 807 denotes a cart, and the reference numeral 808 denotes a workbench. On the UI screen output to the display unit 206, in addition to the display screen 801, information regarding the type of object calculated by the staying analysis unit 312 and a staying value that is an evaluation value regarding whether the object may stay at an initial position may be superimposed and displayed.

FIG. 8B is a diagram showing an example in which a staying value 809 of each object is superimposed and displayed as a data bar on the display screen 801, and FIG. 9 is a table showing examples of the type of object, coordinate position information of the object, and an evaluation value (staying value) of the object calculated by the staying analysis unit 312.

In addition to the display screen 801 shown in FIG. 8, the display unit 206 can also display numerical information. Here, the calculated staying value is normalized to a value from 0 to 100. If a numerical value is small, the displayed gray bar is short, and if the numerical value is great, the displayed gray bar is long.

Figure 10:
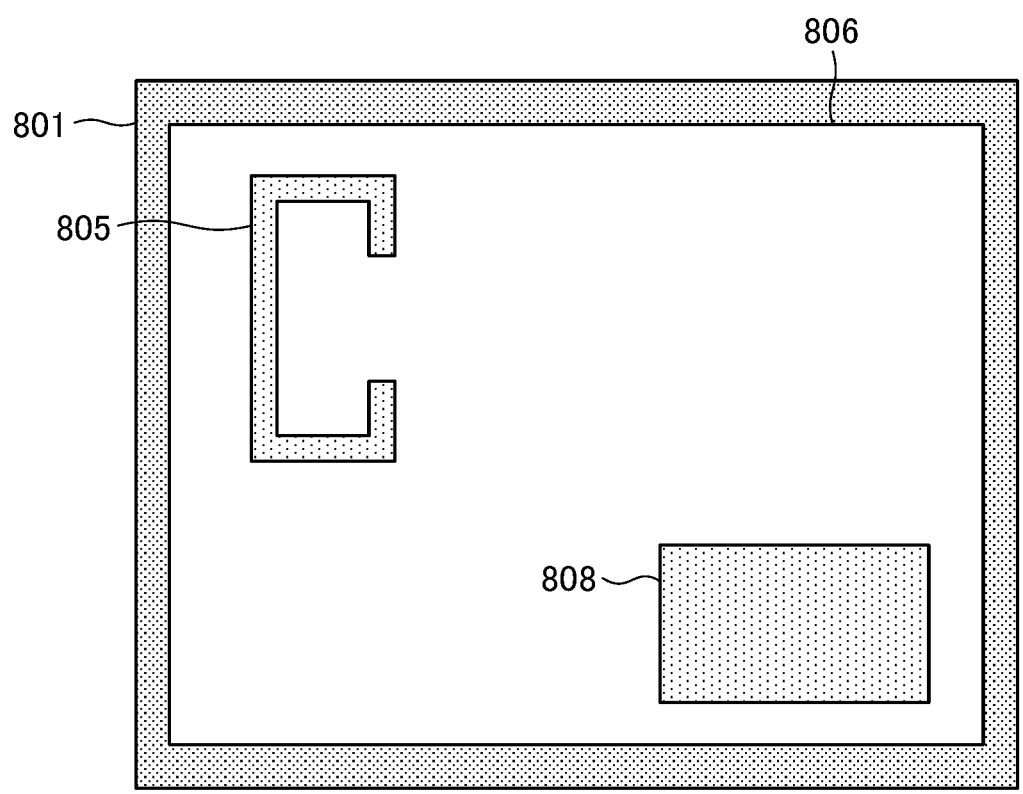
FIG. 10 is a schematic diagram showing an example of a user interface (UI) screen output to a display unit 206 in Third Embodiment.

FIG. 10 is a schematic diagram showing an example of a user interface (UI) screen output to the display unit 206 in Third Embodiment. FIG. 10 shows an example of display of an environment map generated or updated with a threshold value of 30 for determining a staying value of each object as shown in FIG. 8B. As in FIG. 8A, FIG. 10 is a diagram in which map elements of the environment map are projected onto a plane corresponding to a floor surface. Each object of which a staying value is equal to or greater than the threshold value of 30 remains on the environment map as it is, and is thus visualized and displayed. On the other hand, each object of which a staying value is smaller than the threshold value of 30 is deleted from the environment map and is not visualized or displayed.

Since there is a low possibility that the environment changes near an object with a high staying value, the position and posture measurement accuracy is high. On the other hand, since there is a high possibility that the environment changes near an object with a low staying value, the position and posture measurement accuracy is reduced.

As described above, in Third Embodiment, the environment map output from the environment map generation unit 313 and the staying information are displayed on the display unit. The analysis results calculated by the staying analysis unit 312 are visualized and displayed together with the environment map, and thus a user can easily understand the analysis results. If there is an error in the analysis results calculated by the staying analysis unit 312, the user can change the evaluation value or correct the program on the basis of the result.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the information processing apparatus through a network or various storage media. Then, a computer (or a CPU, an MPU, or the like) of the information processing apparatus may be configured to read and execute the program. In such a case, the program and the storage medium storing the program configure the present invention.

This application claims the benefit of Japanese Patent Application No. 2022-065404, filed on Apr. 11, 2022, which is hereby incorporated by reference herein in its entirety.

What is claimed is:

1. An information processing apparatus comprising:
a memory storing instructions; and
at least one processor or circuit executing the instructions causing the information processing apparatus to:
acquire sensor information regarding surroundings of a movable apparatus;
analyze a type of an object that is present around the movable apparatus by using the acquired sensor information;
acquire a staying value indicating a possibility that the object will stay on the basis of the type of the object acquired by the analysis;
generate or update an environment map that corresponds to surrounding information of the movable apparatus on the basis of the staying value; and
control driving of the movable apparatus on the basis of the generated or updated environment map, wherein the staying value is varied according to at least whether the object has wheels or whether the object is equal to or smaller than a predetermined size.

2. The information processing apparatus according to claim 1, wherein the object is recognized on the basis of the sensor information.

3. The information processing apparatus according to claim 1, wherein the environment map is not updated if the staying value of the object is smaller than a predetermined value.

4. The information processing apparatus according to claim 1, wherein the environment map and the staying value are displayed on a display.

5. The information processing apparatus according to claim 1, wherein the sensor information includes any of imaging data obtained by imaging the object, distance imaging data which includes distance information to the object, or three-dimensional point group data representing a shape of the object.

6. The information processing apparatus according to claim 1, wherein the type of the object for a region in which a difference between feature points extracted from the sensor information and feature points of the environment map is equal to or more than a predetermined value is analyzed.

7. A movable apparatus comprising:
a memory storing instructions; and
at least one processor or circuit executing the instructions causing the movable apparatus to:
acquire sensor information regarding surroundings of the movable apparatus;
analyze a type of an object that is present around the movable apparatus by using the acquired sensor information;
acquire a staying value indicating a possibility that the object will stay on the basis of the type of the object acquired by the analysis;
generate or update an environment map that corresponds to surrounding information of the movable apparatus on the basis of the staying value; and
control driving of the movable apparatus on the basis of the generated or updated environment map,
wherein the staying value is varied according to at least whether the object has wheels or whether the object is equal to or smaller than a predetermined size.

8. An information processing method comprising:
acquiring sensor information regarding surroundings of a movable apparatus;
analyzing a type of an object that is present around the movable apparatus by using the acquired sensor information;
acquiring a staying value indicating a possibility that the object will stay on the basis of the type of the object acquired by the analysis;
generating or updating an environment map that is surrounding information of the movable apparatus on the basis of the staying value; and
controlling driving of the movable apparatus on the basis of the generated or updated environment map,
wherein the staying value is varied according to at least whether the object has wheels or whether the object is equal to or smaller than a predetermined size.

9. A non-transitory computer-readable storage medium on which is stored computer-executable code of a computer program comprising instructions for causing a processor to execute the following processes:
acquiring sensor information regarding surroundings of a movable apparatus;
analyzing a type of an object that is present around the movable apparatus by using the acquired sensor information;
acquiring a staying value indicating a possibility that the object will stay on the basis of the type of the object acquired by the analysis;
generating or updating an environment map that is surrounding information of the movable apparatus on the basis of the staying value; and
controlling driving of the movable apparatus on the basis of the generated or updated environment map,
wherein the staying value is varied according to at least whether the object has wheels or whether the object is equal to or smaller than a predetermined size.

* * * * *